(12) United States Patent
Pearson et al.

(10) Patent No.: US 12,061,769 B2
(45) Date of Patent: *Aug. 13, 2024

(54) SYSTEMS AND METHODS FOR MANAGING SECURITY EVENTS USING A GRAPHICAL USER INTERFACE

(71) Applicant: Johnson Controls Tyco IP Holdings LLP, Milwaukee, WI (US)

(72) Inventors: Robert Pearson, Dover, MA (US); Sanela Suljic, Nashua, NH (US); Brian Richard, Lunenburg, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,585

(22) Filed: Apr. 28, 2023

(65) Prior Publication Data

US 2023/0259251 A1 Aug. 17, 2023

Related U.S. Application Data

(63) Continuation of application No. 17/495,324, filed on Oct. 6, 2021, now Pat. No. 11,675,477.

(51) Int. Cl.
*G06F 3/048* (2013.01)
*G06F 3/04817* (2022.01)
*G06F 3/0482* (2013.01)
*G06F 3/04842* (2022.01)
*G06F 3/04847* (2022.01)

(52) U.S. Cl.
CPC ........ *G06F 3/04817* (2013.01); *G06F 3/0482* (2013.01); *G06F 3/04842* (2013.01); *G06F 3/04847* (2013.01)

(58) Field of Classification Search
None
See application file for complete search history.

(56) References Cited

U.S. PATENT DOCUMENTS

| | | |
|---|---|---|
| 2004/0260720 A1 | 12/2004 | Cossins et al. |
| 2015/0333987 A1 | 11/2015 | Fletcher et al. |
| 2016/0105644 A1 | 4/2016 | Smith et al. |
| 2016/0231909 A1 | 8/2016 | Olsson et al. |

(Continued)

OTHER PUBLICATIONS

International Search Report in PCT/US2022/077465, mailed Jan. 30, 2023, 3 pages.

*Primary Examiner* — Thanh T Vu
(74) *Attorney, Agent, or Firm* — ARENTFOX SCHIFF LLP (57) ABSTRACT

Example implementations include a method, apparatus and computer-readable medium for managing security events via a graphical user interface (GUI), comprising receiving an indication of a first security event occurring in an environment, determining a priority value of the first security event, and creating a first identifier of the first security event, wherein the first identifier is a visual icon of a given shape. The implementations further include assigning a size and color to the first identifier of the first security event based on the priority value and generating, for display on the GUI, the first identifier of the first security event, wherein the GUI is configured to display identifiers of one or more security events in a selectable layout of a plurality of selectable layouts, wherein selection of the first identifier generates a panel of selectable actions that can be executed to address the first security event.

21 Claims, 8 Drawing Sheets

(56) References Cited

U.S. PATENT DOCUMENTS

| | | |
|---|---|---|
| 2017/0102855 A1 | 4/2017 | Kwon et al. |
| 2018/0033279 A1 | 2/2018 | Chong et al. |
| 2018/0101901 A1 | 4/2018 | Jones-McFadden et al. |
| 2020/0145620 A1 | 5/2020 | Alcantra et al. |
| 2020/0396328 A1 | 12/2020 | Salminen et al. |
| 2022/0050911 A1 | 2/2022 | Evans |

SYSTEMS AND METHODS FOR MANAGING SECURITY EVENTS USING A GRAPHICAL USER INTERFACE

CROSS-REFERENCE TO RELATED APPLICATIONS

The present application is a continuation of U.S. Nonprovisional patent application Ser. No. 17/495,324, entitled "SYSTEMS AND METHODS FOR MANAGING SECURITY EVENTS USING A GRAPHICAL USER INTERFACE," filed on Oct. 6, 2021, which is incorporated by reference herein.

TECHNICAL FIELD

The described aspects relate to security systems.

BACKGROUND

Aspects of the present disclosure relate generally to security systems, and more particularly, to managing security events using a graphical user interface.

Conventional security systems often list sensor data in clunky interfaces—in some cases simply listing data without indicating which data needs to be viewed first. Users that monitor this data may face life-threatening or urgent security events (e.g., fires, intrusions, etc.) that need to be presented immediately and in a manner that directs the attention of a user to the event.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for managing security events via a graphical user interface (GUI), including receiving an indication of a first security event occurring in an environment, wherein the first security event is detected by at least one sensor in the environment. The method further includes determining a priority value of the first security event based on a type of the first security event. Additionally, the method further includes creating a first identifier of the first security event, wherein the first identifier is a visual icon of a given shape. Additionally, the method further includes assigning a size and color to the first identifier of the first security event based on the priority value. Additionally, the method further includes generating, for display on the GUI, the first identifier of the first security event, wherein the GUI is configured to display identifiers of one or more security events in a selectable layout of a plurality of selectable layouts. Additionally, the method further includes receiving a selection of the first identifier. Additionally, the method further includes generating, for display, a panel comprising information about the first security event and a plurality of actions to address the first security event. Additionally, the method further includes receiving a selection of an action from the plurality of actions. Additionally, the method further includes executing the action to address the first security event.

Another example implementation includes an apparatus for managing security events via a graphical user interface (GUI), comprising a memory and a processor in communication with the memory. The processor is configured to receive an indication of a first security event occurring in an environment, wherein the first security event is detected by at least one sensor in the environment. The processor is further configured to determine a priority value of the first security event based on a type of the first security event. Additionally, the processor further configured to create a first identifier of the first security event, wherein the first identifier is a visual icon of a given shape. Additionally, the processor further configured to assign a size and color to the first identifier of the first security event based on the priority value. Additionally, the processor further configured to generate, for display on the GUI, the first identifier of the first security event, wherein the GUI is configured to display identifiers of one or more security events in a selectable layout of a plurality of selectable layouts. Additionally, the processor further configured to receive a selection of the first identifier. Additionally, the processor further configured to generate, for display, a panel comprising information about the first security event and a plurality of actions to address the first security event. Additionally, the processor further configured to receive a selection of an action from the plurality of actions. Additionally, the processor further configured to execute the action to address the first security event.

Another example implementation includes a computer-readable medium storing instructions for managing security events via a graphical user interface (GUI), wherein the instructions are executable by a processor to receive an indication of a first security event occurring in an environment, wherein the first security event is detected by at least one sensor in the environment. The instructions are further executable to determine a priority value of the first security event based on a type of the first security event. Additionally, the instructions are further executable to create a first identifier of the first security event, wherein the first identifier is a visual icon of a given shape. Additionally, the instructions are further executable to assign a size and color to the first identifier of the first security event based on the priority value. Additionally, the instructions are further executable to generate, for display on the GUI, the first identifier of the first security event, wherein the GUI is configured to display identifiers of one or more security events in a selectable layout of a plurality of selectable layouts. Additionally, the instructions are further executable to receive a selection of the first identifier. Additionally, the instructions are further executable to generate, for display, a panel comprising information about the first security event and a plurality of actions to address the first security event. Additionally, the instructions are further executable to receive a selection of an action from the plurality of actions. Additionally, the instructions are further executable to execute the action to address the first security event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide a graphical user interface (GUI) for managing security events. The present disclosure describes security identifiers, each of a particular shape, size, and color in accordance with a priority and timestamp of the event they correspond to. Urgent events are thus presented on the GUI with large and prominent identifiers, whereas trivial events are presented on the GUI with smaller and subtle identifiers. Depending on how the security event develops and the preferences of the user accessing the GUI, the identifiers may be visually adjusted to improve the efficiency at which the user manages/resolves the security events.

Figure 1:
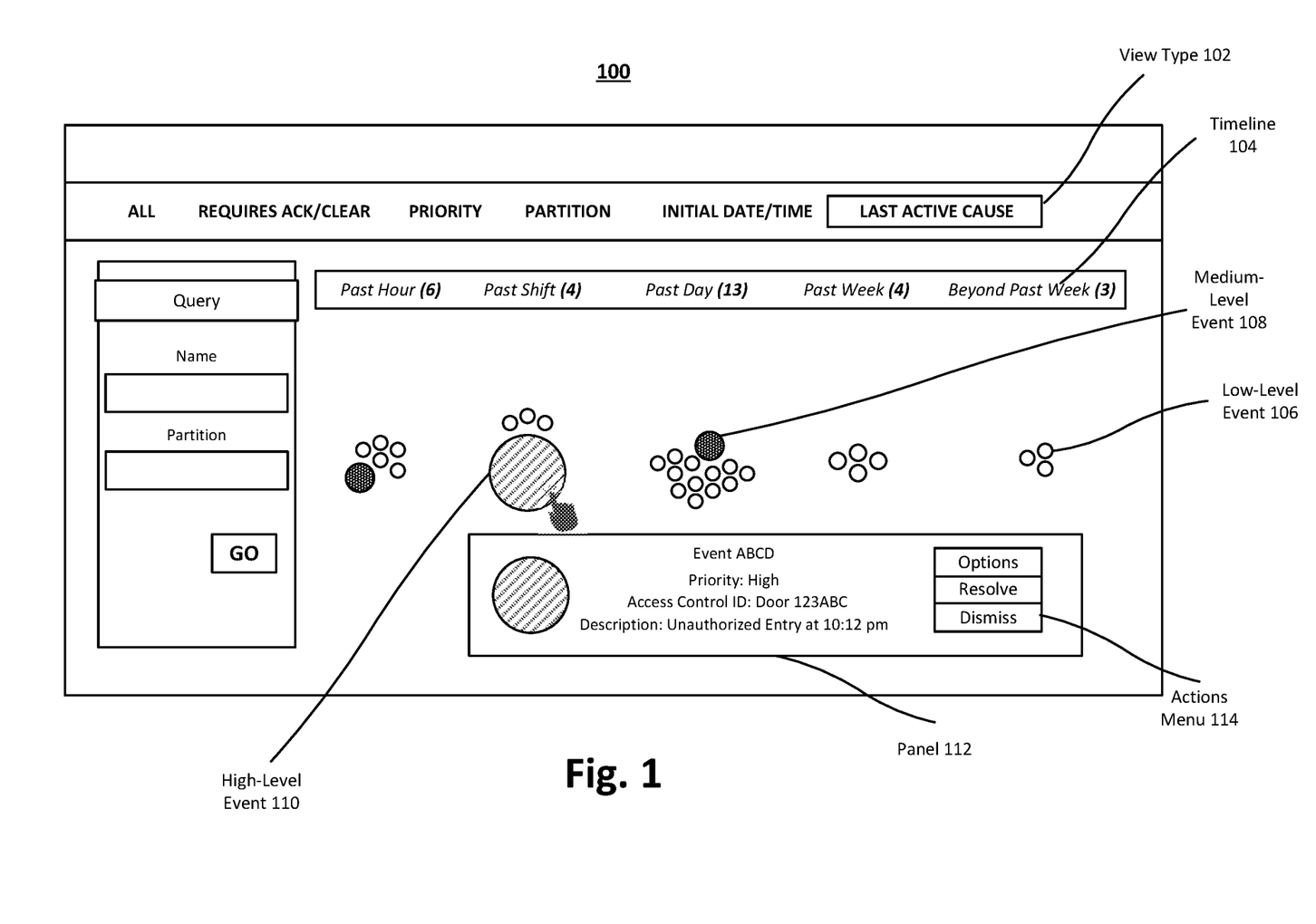
FIG. 1 is a diagram of a graphics user interface (GUI) depicting security event identifiers based on time of occurrence, in accordance with exemplary aspects of the present disclosure.

FIG. 1 is a diagram of a GUI 100 depicting security event identifiers based on time of occurrence, in accordance with exemplary aspects of the present disclosure. GUI 100 may be generated by a security visualization component 515 (described in FIG. 5). A security event may be an occurrence in an environment that is detected by one or more sensors located at the environment. For example, a security event may be a detected fire. The sensors that can trigger this security event may include a carbon monoxide sensor, a fire alarm lever, a heat sensor, a smoke detector, a security camera, etc. Another example of a security event may be flooding. The sensors that can trigger this security event may include a water detector, a security camera, a water pressure sensor in a pipe, etc. Yet another example of a security event may be an entry into the environment by an individual. The sensors that can trigger this security event may include a security camera, an infrared sensor, a thermal sensor, a sound sensor, a badge scanner, an occupancy counting system, etc.

Due to the variety of security events that may arise in an environment, a user (e.g., a security staff member) monitoring a security interface needs to be alert when handling event resolutions (e.g., putting out a fire, draining water, granting/denying access). Security visualization component 515 is configured to generate GUI 100 in a manner that can decrease a search/access time for a user by representing each security event with its own identifier and enabling different organization layouts. In one example of GUI 100, a situation is illustrated that includes 30 security events that are generated for display. The security identifiers are circles of an assigned size and color/pattern. For example, high-level event 110 has an identifier with the largest sized circle and a striped pattern. High-level event 110 may need immediate attention. For example, high-level event 110 may be an intrusion in the environment by an unauthorized person. Medium-level event 108 may have the next largest sized circle and a grid pattern. Medium-level event 108 may need to be addressed before low-level event 106 (smallest circle with no pattern) and after high-level event 110. For example, medium-level event 108 may be an adjustment of a thermostat and low-level event 106 may be an entry into the environment by an authorized user. It should be noted that GUI 100 may include security identifiers having any one of a plurality of different shapes, icons, colors, and/or patterns.

In the example layout of GUI 100, a view type 102 of "last active cause" is used to organize the identifiers based on when they were last updated. View type 102 is a selection of a layout. Other layouts may include, but are not limited to: "requires ack/clr," in which only identifiers of events that need to be acknowledged ("ack") or cleared ("clr") are shown; "priority," in which identifiers are organized based on the priority value they are assigned; "partition," in which identifiers are split based on physical locations (e.g., partitions of the environment); "initial date/time," in which identifiers are organized based on when they were first generated; and "all," in which all identifiers are organized in any given order (e.g., alphabetical). In GUI 100, because view type 102 is "last active cause," the plurality of identifiers are organized in accordance with timeline 104, which groups identifiers in one of "past hour," "past shift," "past day," "past week," and "beyond past week." It is noted that the timeline 104 of the GUI 100 may be configured with any number of different time groups having any number of different time periods.

When a user selects an identifier (e.g., high-level event 110), security visualization component 515 generates panel 112, which includes details about the event and actions menu 114. For example, in GUI 100, high-level event 110 is described to be event "ABCD," which has a high priority level, and involved an unauthorized entity gaining entry into the environment at 10:12 pm through door 123ABC. Actions menu 114 lets a user dismiss the event (e.g., delete the identifier from GUI 100), resolve the event (e.g., store information about the event as resolved in a historical events database), or access more options (e.g., view security footage, alert nearby security on patrol, lock doors, etc.).

A user may also search for specific events using the query box on GUI 100. For example, if the user searched for an attribute of high-level event 110 (e.g., typed "event ABCD," "high," "doors," "unauthorized entry," "break-in," etc.), only the search results (e.g., in this example, including high-level event 110) would be shown on GUI 100.

Figure 2:
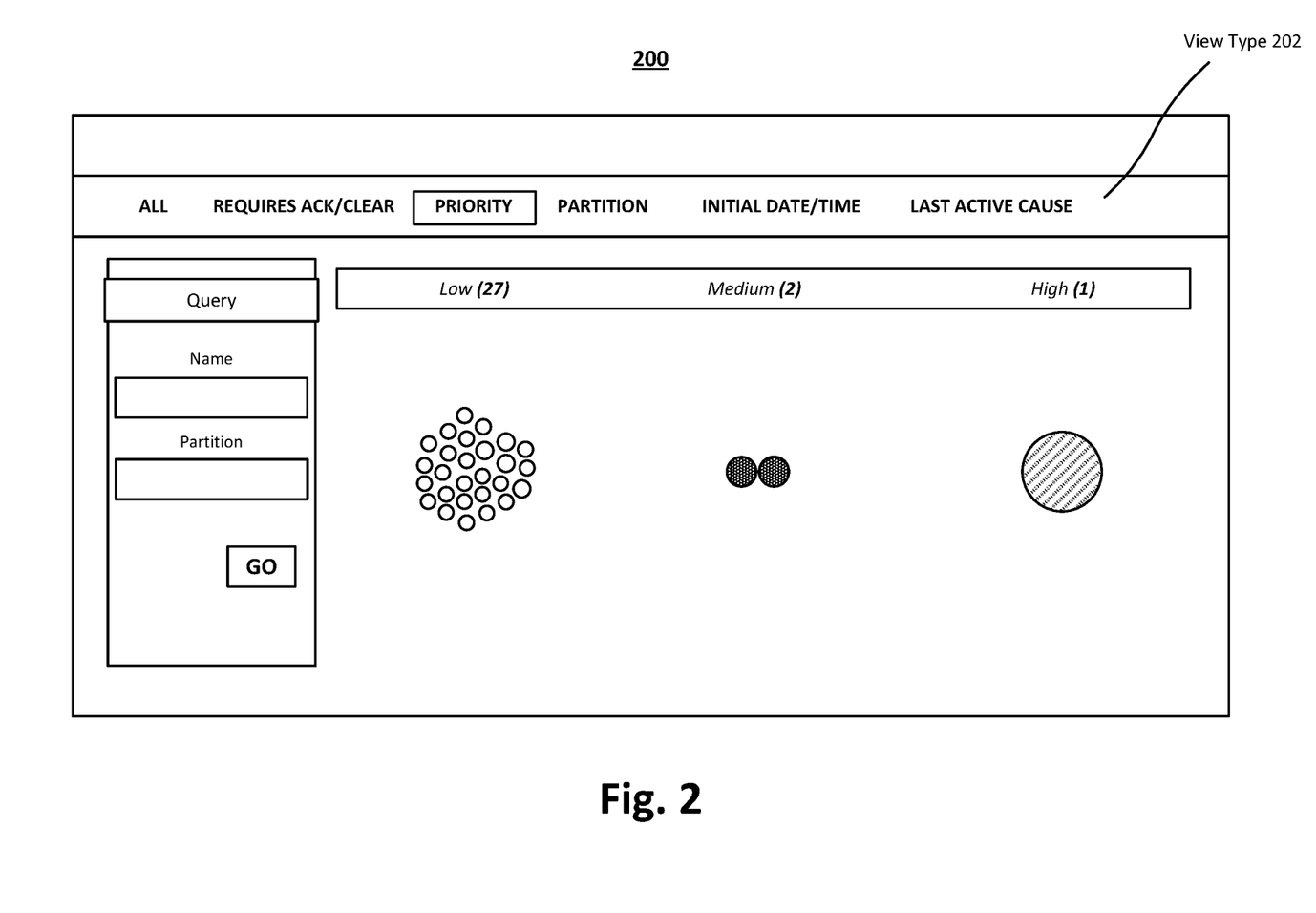
FIG. 2 is a diagram of a GUI depicting security event identifiers based on priority, in accordance with exemplary aspects of the present disclosure.

FIG. 2 is a diagram of GUI 200 depicting security event identifiers based on priority, in accordance with exemplary aspects of the present disclosure. GUI 200 is a version of GUI 100 in which the layout has changed from view type 102 associated with "last active cause" to view type 202 associated with "priority." More specifically, in this example, a user may select to view the plurality of identifiers based on their priority level rather than the last active cause. In view type 202, the plurality of identifiers are organized under two or more configured levels, such as but not limited to three levels: low, medium, high. It should be noted that the layouts and the classes for each layout are shown in simplicity. One skilled in the art will appreciate that view type 202 may include more than three priority levels. As can be seen, the plurality of identifiers in GUI 100 have new positions on the GUI, but retain their size, color/pattern, and priority value.

Figure 3:
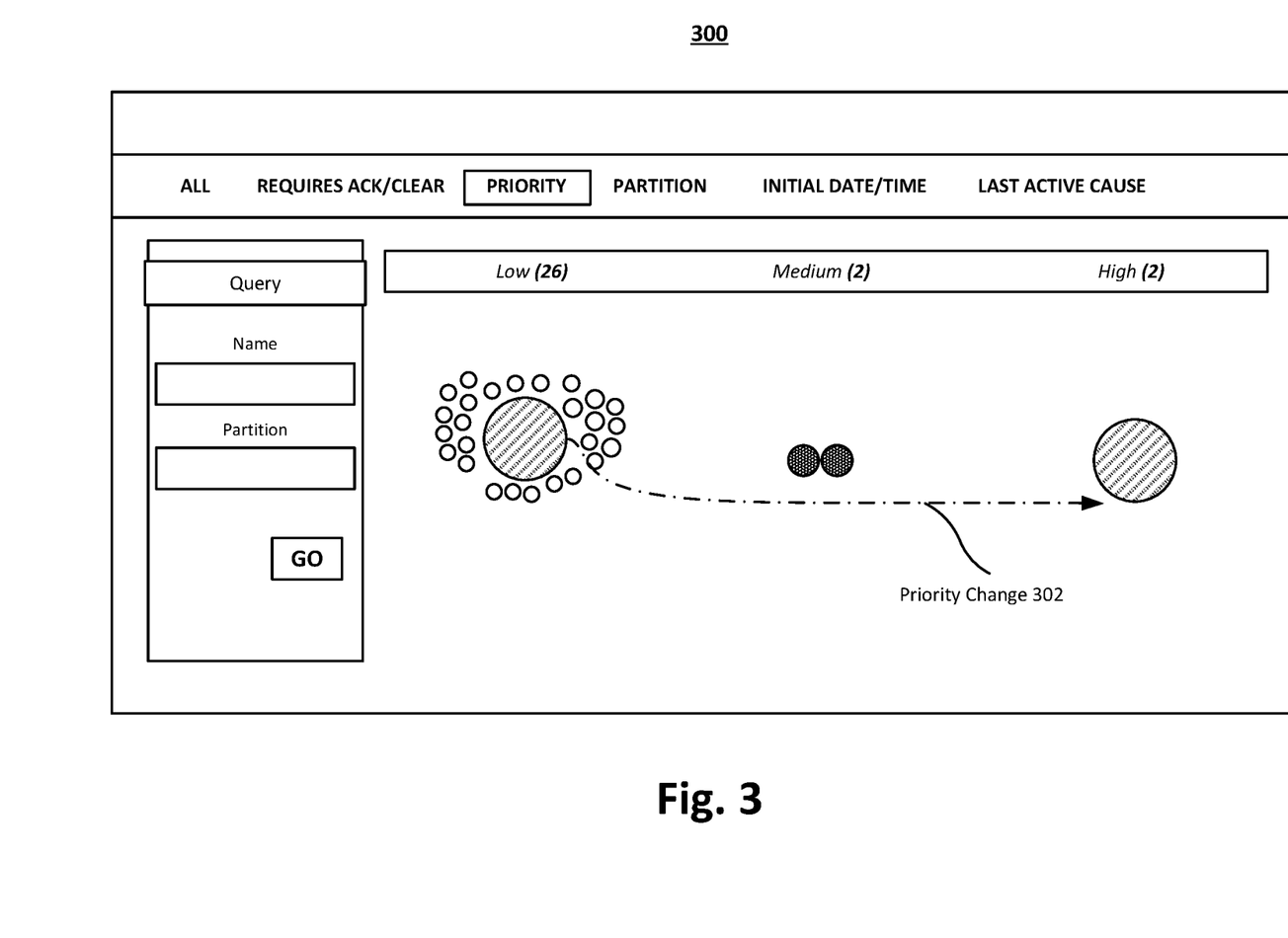
FIG. 3 is a diagram of a GUI depicting security event identifiers undergoing a priority change, in accordance with exemplary aspects of the present disclosure.

FIG. 3 is a diagram of GUI 300 depicting security event identifiers undergoing a priority change, in accordance with exemplary aspects of the present disclosure. GUI 300 is a version of GUI 200, in which a low-level security event has a change in priority and becomes a high-level security event. Priority change 302 may occur due to several factors including user preference (e.g., an event is more relevant to a particular user) and event escalation (e.g., smoke detection has now become a fire detection). For example, a water pressure security event may be more relevant to a user that is a plumber than a user that is an electrician. Accordingly, if security visualization component 515 detects that a plumber is accessing GUI 300 instead of an electrician (that was possibly accessing GUI 300 just previously to the plumber), security visualization component 515 may adjust the priority level of the water pressure issue event from low to high, which causes a visual adjustment of an identifier representing the event (e.g., larger size, different color/pattern). In some aspects, the priority change 302 may be depicted as an animation that depicts the enlarging and physical shift on the GUI 300 of the identifier from priority level "low" to priority level "high."

Figure 4:
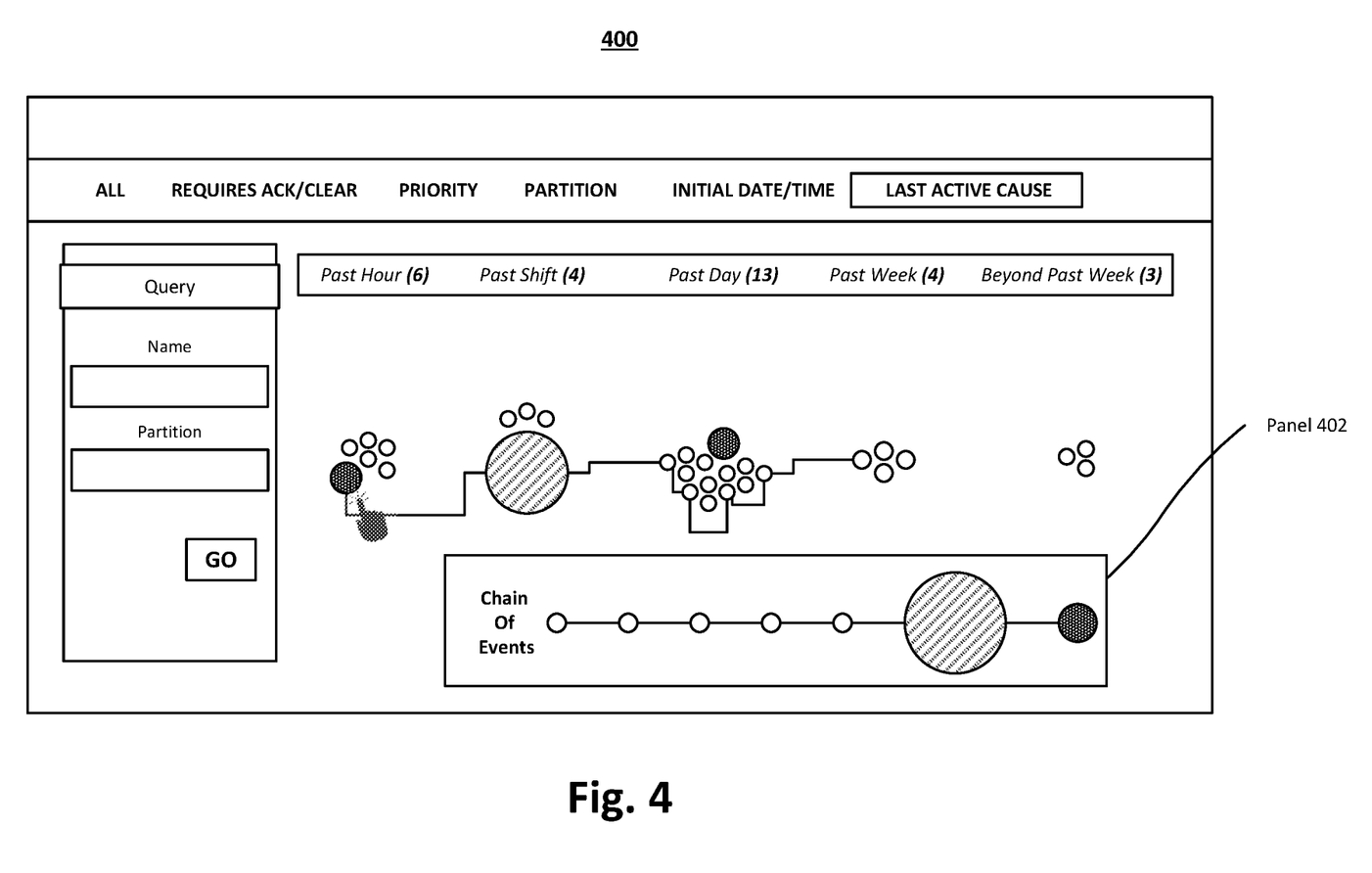
FIG. 4 is a diagram of a GUI depicting security event identifiers that are linked to each other, in accordance with exemplary aspects of the present disclosure.

FIG. 4 is a diagram of GUI 400 depicting security event identifiers that are linked to each other, in accordance with exemplary aspects of the present disclosure. GUI 400 is a version of GUI 100 that further displays links between events. For example, one event may be connected to another by cause and effect (e.g., short-circuiting device may lead to a fuse, which may lead to a router shutting down, which may lead to sensors disconnecting from the Internet access, etc.). When a user selects any identifier that is linked to another identifier, security visualization component 515 may generate panel 402 for display. Panel 402 includes a chain of events that visually connects the identifiers for easy viewing. This layout enables a user to resolve one event and automatically resolve the others. For example, if the user selects and executes an action that resets the electrical panel of the environment, the router will automatically start stabling the Internet connection, and all other sensors will be able to connect to the Internet again. This way the user does not have to resolve each event individually and can gain access to the root cause of multiple events.

Figure 5:
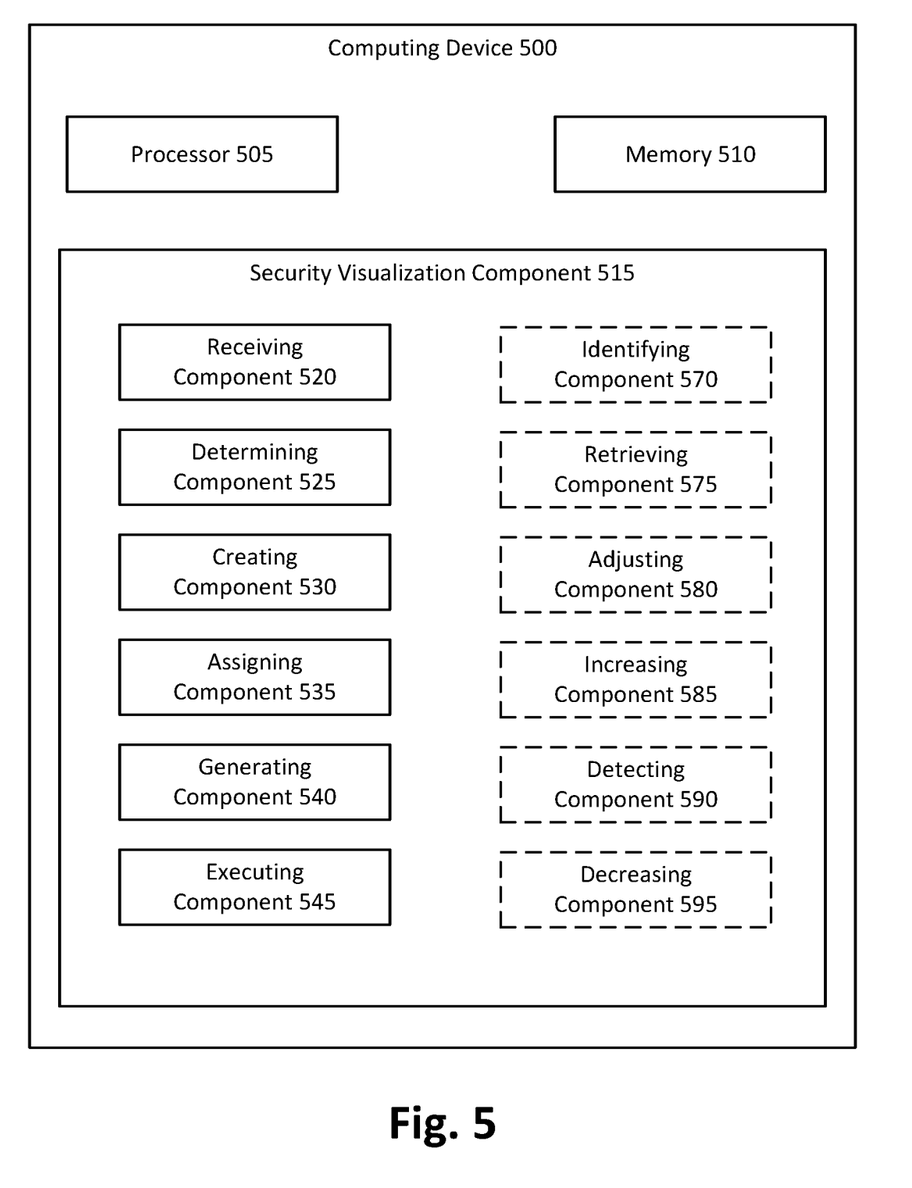
FIG. 5 is a block diagram of a computing device executing a security visualization component, in accordance with exemplary aspects of the present disclosure.
Figure 6:
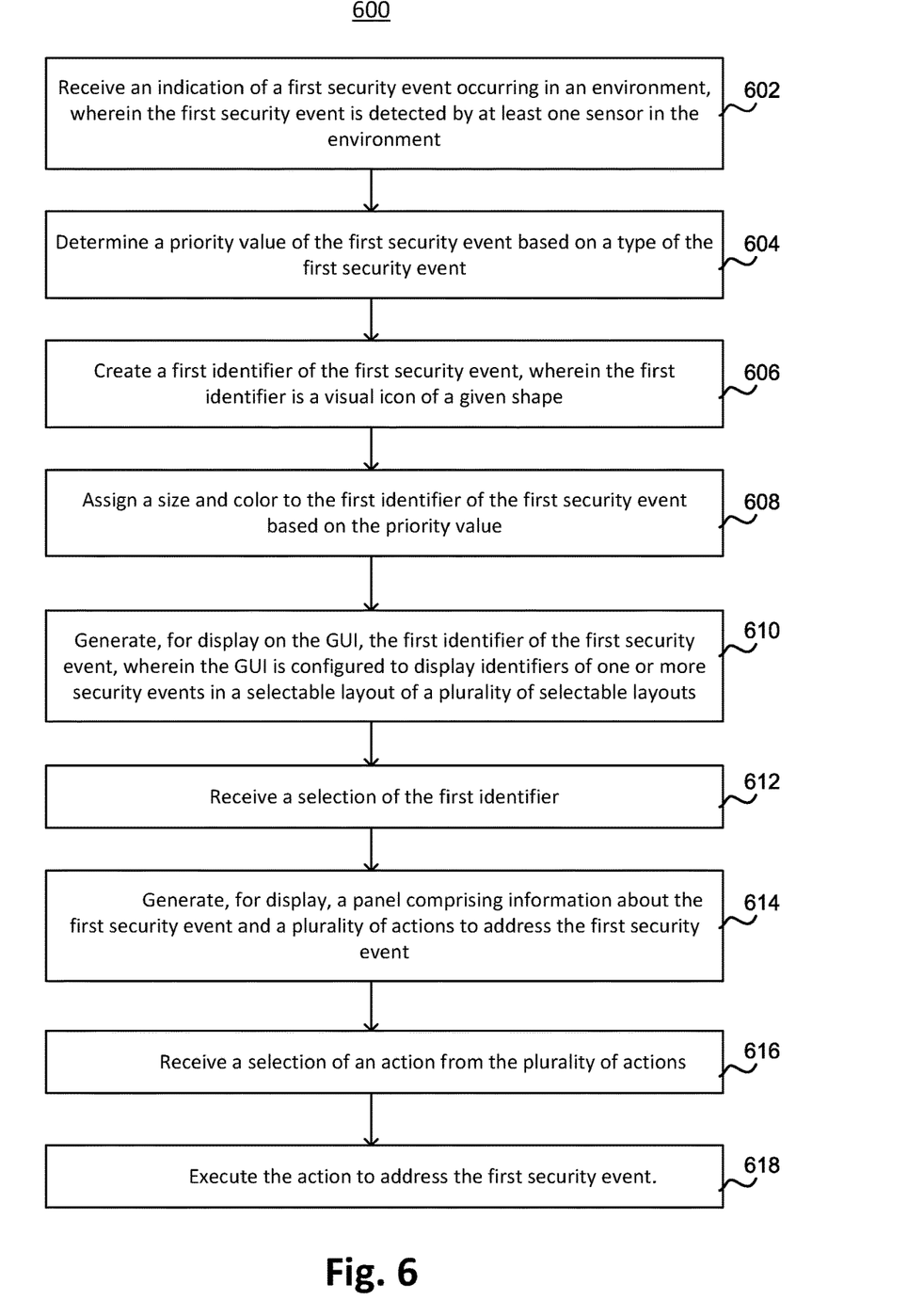
FIG. 6 is a flowchart illustrating a method of managing security events via a GUI, in accordance with exemplary aspects of the present disclosure.

Referring to FIG. 5 and FIG. 6, in operation, computing device 500 may perform a method 600 of managing security events via a graphical user interface (GUI), by such as via execution of security visualization component 515 by processor 505 and/or memory 510. FIG. 6 is a flowchart illustrating a method 600 of managing security events via a GUI, in accordance with exemplary aspects of the present disclosure.

At block 602, the method 600 includes receiving an indication of a first security event occurring in an environment, wherein the first security event is detected by at least one sensor in the environment. For example, in an aspect, computing device 500, processor 505, memory 510, security visualization component 515, and/or receiving component 520 may be configured to or may comprise means for receiving an indication of a first security event occurring in an environment, wherein the first security event is detected by at least one sensor in the environment.

The environment may be any physical location where a plurality of sensors for access control are set up. For example, the environment may be a college campus or an office building. Examples of sensors include, but are not limited to, cameras, temperature sensors, water sensors, biometric scanners, door locks, and lights. The first security event may be detection of a fire and may be generated based on a combination of sensor data (e.g., fire alarm, camera depicting a fire, etc.). Security visualization component 515 may receive the indication from a security module that parses such sensor data to generate security events.

At block 604, the method 600 includes determining a priority value of the first security event based on a type of the first security event. For example, in an aspect, computing device 500, processor 505, memory 510, security visualization component 515, and/or determining component 525 may be configured to or may comprise means for determining a priority value of the first security event based on a type of the first security event.

There may be a finite number of security event types stored in memory 510. In some aspects, the type of the security event is determined by the security module that generated the security event. In other aspects, security visualization component 515 may classify the type of the security event into one of the finite number of security event types. For example, the first security event of a fire detection may be classified as a "fire hazard." Other examples of security event types may include "authorized entry," "unauthorized entry," "water hazard," "electrical outage," "connectivity issue."

Determining component 525 may retrieve the priority value from a database comprising a list of types of security events and corresponding priority values. The database may be stored in memory 510. For example, in the database, "fire hazard" may be associated with a priority value of "high," "authorized entry" may be associated with a priority value of "low," "connectivity issue," may be associated with a priority value of "medium." It should be noted that the priority values of "low," "medium," and "high" are described for simplicity. A priority value may be any quantitative or qualitative assessment of an event's importance relative to another set of events.

At block 606, the method 600 includes creating a first identifier of the first security event, wherein the first identifier is a visual icon of a given shape. For example, in an aspect, computing device 500, processor 505, memory 510, security visualization component 515, and/or creating component 530 may be configured to or may comprise means for creating a first identifier of the first security event, wherein the first identifier is a visual icon of a given shape.

At block 608, the method 600 includes assigning a size and color to the first identifier of the first security event based on the priority value. For example, in an aspect, computing device 500, processor 505, memory 510, security visualization component 515, and/or assigning component 535 may be configured to or may comprise means for assigning a size and color to the first identifier of the first security event based on the priority value.

The database that maps priority values may also include a size, color/pattern, or shape that the particular event type should have. For example, the first security event may be represented by a first identifier that is shaped as a large circle and has a striped pattern as its fill (e.g., comparable to the identifier of high-level event 110 in FIG. 1). The visual icon gives the event a prominence over other event identifiers, which can direct the attention of a user to the event.

At block 610, the method 600 includes generating, for display on the GUI, the first identifier of the first security event, wherein the GUI is configured to display identifiers of one or more security events in a selectable layout of a plurality of selectable layouts. For example, in an aspect, computing device 500, processor 505, memory 510, security visualization component 515, and/or generating component 540 may be configured to or may comprise means for generating, for display on the GUI, the first identifier of the first security event, wherein the GUI is configured to display identifiers of one or more security events in a selectable layout of a plurality of selectable layouts. For example, generating component 540 may generate an identifier on GUI 100 (e.g., an identifier comparable to high-level event 110) in the "past hour" region. In some aspects, the selectable layout organizes the identifiers of the one or more identifiers based on one of: respective priority value, time of occurrence, and a location of occurrence.

At block 612, the method 600 includes receiving a selection of the first identifier. For example, in an aspect, computing device 500, processor 505, memory 510, security visualization component 515, and/or receiving component 520 may be configured to or may comprise means for receiving a selection of the first identifier. For example, a user may select the identifier representing high-level event 110 using a touchscreen, a mouse, a gesture analyzing camera, or any interfacing component of computing device 500 where GUI 100 is generated.

At block 614, the method 600 includes generating, for display, a panel comprising information about the first security event and a plurality of actions to address the first security event. For example, in an aspect, computing device 500, processor 505, memory 510, security visualization component 515, and/or generating component 540 may be configured to or may comprise means for generating, for display, panel 112 comprising information about the first security event and a plurality of actions (e.g., actions menu 114) to address the first security event.

At block 616, the method 600 includes receiving a selection of an action from the plurality of actions. For example, in an aspect, computing device 500, processor 505, memory 510, security visualization component 515, and/or receiving component 520 may be configured to or may comprise means for receiving a selection of an action from the plurality of actions. For example, the user may select an action that activates a water sprinkling system in the partition of the environment where the fire is detected.

At block 618, the method 600 includes executing the action to address the first security event. For example, in an aspect, computing device 500, processor 505, memory 510, security visualization component 515, and/or executing component 545 may be configured to or may comprise means for executing the action to address the first security event. For example, executing component 545 may command the water sprinkler system to activate the water.

Figure 7:
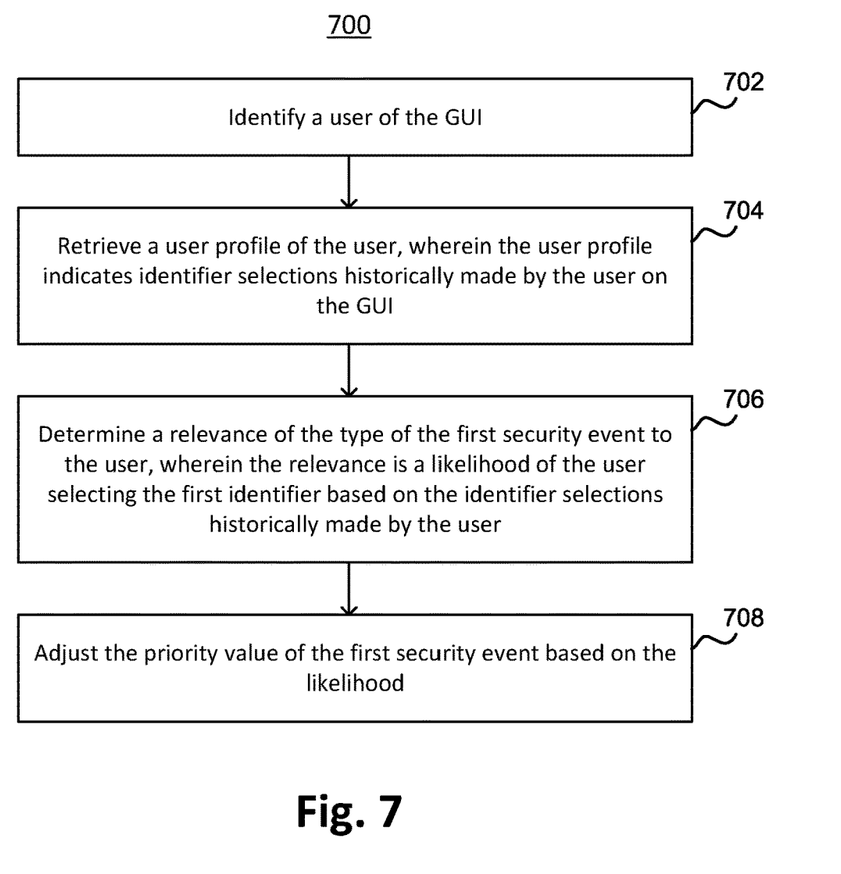
FIG. 7 is a flowchart illustrating a method of adjusting priority value of a security event, in accordance with exemplary aspects of the present disclosure.

FIG. 7 is a flowchart illustrating a method 700 of adjusting priority value of a security event, in accordance with exemplary aspects of the present disclosure that may operate in association with method 600.

In an optional aspect, referring to FIG. 7, at block 702, the method 700 includes identifying a user of the GUI. For example, in an aspect, computing device 500, processor 505, memory 510, security visualization component 515, and/or identifying component 570 may be configured to or may comprise means for identifying a user of the GUI.

In some aspects, a user may log into a profile when using the GUI. Identifying component 570 may identify the user based on the user credentials of the profile. The login credentials may be a facial image, a username/password combination, an iris image, a voice pattern, a fingerprint, etc.

At block 704, the method 700 includes retrieving a user profile of the user, wherein the user profile indicates identifier selections historically made by the user on the GUI. For example, in an aspect, computing device 500, processor 505, memory 510, security visualization component 515, and/or retrieving component 575 may be configured to or may comprise means for retrieving a user profile of the user, wherein the user profile indicates identifier selections historically made by the user on the GUI.

For example, whenever a user logs in to the GUI, security visualization component 515 may record the actions that the user makes on the GUI in memory 510. For example, a user may dismiss an identifier, reset a sensor, alert a patrolling officer, adjust the layout into a particular user type, access information for a particular type of event, etc.

At block 706, the method 700 includes determining a relevance of the type of the first security event to the user, wherein the relevance is a likelihood of the user selecting the first identifier based on the identifier selections historically made by the user. For example, in an aspect, computing device 500, processor 505, memory 510, security visualization component 515, and/or determining component 525 may be configured to or may comprise means for determining a relevance of the type of the first security event to the user, wherein the relevance is a likelihood of the user selecting the first identifier based on the identifier selections historically made by the user.

For example, if the user has made 70 identifier selections on the GUI and 35 identifiers are of a "fire hazard" type, the likelihood of the user accessing a "fire hazard" type event is 50%. Suppose that the user further dismisses 20 of the non-"fire hazard" type events. This implies that the user is not interested in those events. The likelihood of the user accessing those event types decreases and the likelihood of the user accessing "fire hazard" type events increases.

In some aspects, security visualization component 515 analyzes the usage habits (e.g., identifier selections) of the user in a particular period of time to get the latest habits. For example, a user may get promoted or reassigned to a particular security division (e.g., move from one branch in a first location to a second branch in a second location). Accordingly, the user may be interested in viewing other security events and GUI should dynamically adjust the identifiers to be more relevant to the user.

At block 708, the method 700 includes adjusting the priority value of the first security event based on the likelihood. For example, in an aspect, computing device 500, processor 505, memory 510, security visualization component 515, and/or adjusting component 580 may be configured to or may comprise means for adjusting the priority value of the first security event based on the likelihood. For example, if the priority value of the event is "low," adjusting component 580 may set the priority value to "medium." In some aspects, the adjustment in priority value is based on the magnitude of the likelihood. For example, if the likelihood is greater than 70%, the priority value should be "high;" if the likelihood is between 40% and 70%, the priority value should be "medium;" if the likelihood is less than 40%, the priority value should be "low."

Figure 8:
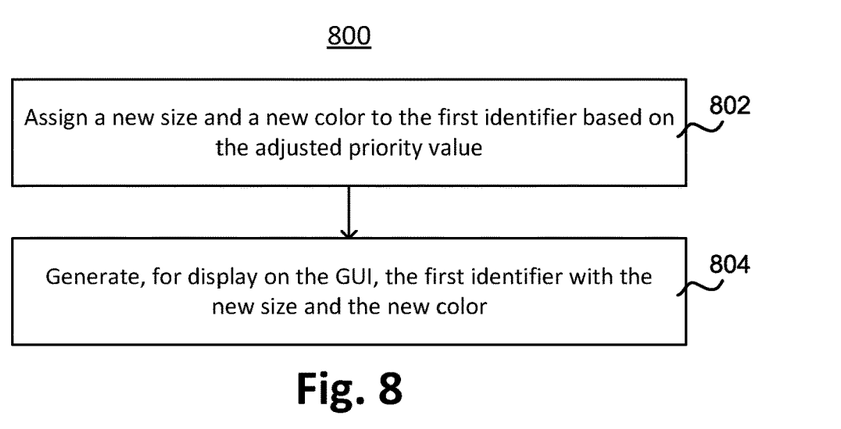
FIG. 8 is a flowchart illustrating a method of visually adjusting the security identifier based on priority value, in accordance with exemplary aspects of the present disclosure.

FIG. 8 is a flowchart illustrating a method 800 of visually adjusting the security identifier based on priority value, in accordance with exemplary aspects of the present disclosure that may operate in association with method 600 and/or 700. Method 800 may be executed by security visualization component 515 subsequent to executing method 700.

In an optional aspect, referring to FIG. 8, at the block 802, the method 800 includes assigning a new size and a new color to the first identifier based on the adjusted priority value. For example, in an aspect, computing device 500, processor 505, memory 510, security visualization component 515, and/or assigning component 535 may be configured to or may comprise means for assigning a new size and a new color to the first identifier based on the adjusted priority value.

At block 804, the method 800 includes generating, for display on the GUI, the first identifier with the new size and the new color. For example, in an aspect, computing device 500, processor 505, memory 510, security visualization component 515, and/or generating component 540 may be configured to or may comprise means for generating, for display on the GUI, the first identifier with the new size and the new color. For example, the first identifier may be transformed from a small white circle to a large striped circle shown by priority change 302 in FIG. 3.

Figure 9:
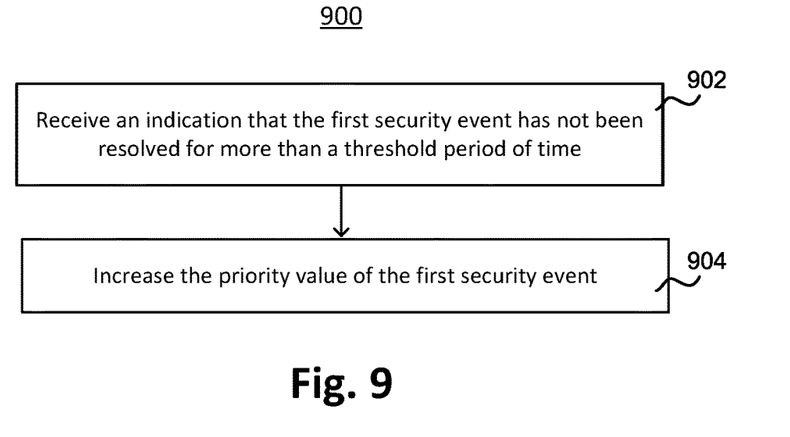
FIG. 9 is a flowchart illustrating a method of increasing priority value based on time, in accordance with exemplary aspects of the present disclosure.

FIG. 9 is a flowchart illustrating a method 900 of increasing priority value based on time, in accordance with exemplary aspects of the present disclosure that may operate in association with method 600, 700, and/or 800.

In an optional aspect, referring to FIG. 9, at block 902, the method 900 includes receiving an indication that the first security event has not been resolved for more than a threshold period of time. For example, in an aspect, computing device 500, processor 505, memory 510, security visualization component 515, and/or receiving component 520 may be configured to or may comprise means for receiving an indication that the first security event has not been resolved for more than a threshold period of time.

For example, receiving component 520 may track the amount of time that an identifier has been presented on the GUI without being resolved. The threshold period of time may be linked to the type of event. Certain types of events may escalate in urgency if not addressed immediately. For example, detection of smoke may start as a "medium" event, but as time passes by and the amount of smoke increases, the priority value should increase.

At block 904, the method 900 includes increasing the priority value of the first security event. For example, in an aspect, computing device 500, processor 505, memory 510, security visualization component 515, and/or increasing component 585 may be configured to or may comprise means for increasing the priority value of the first security event. For example, a "smoke detection" type of event may have a threshold of 10 minutes. When the identifier for the event is generated and 10 minutes has elapsed without the event being resolved (e.g., the identifier being dismissed or selected to execute an action), the priority value of the event may be increased to "high" from "medium."

Figure 10:
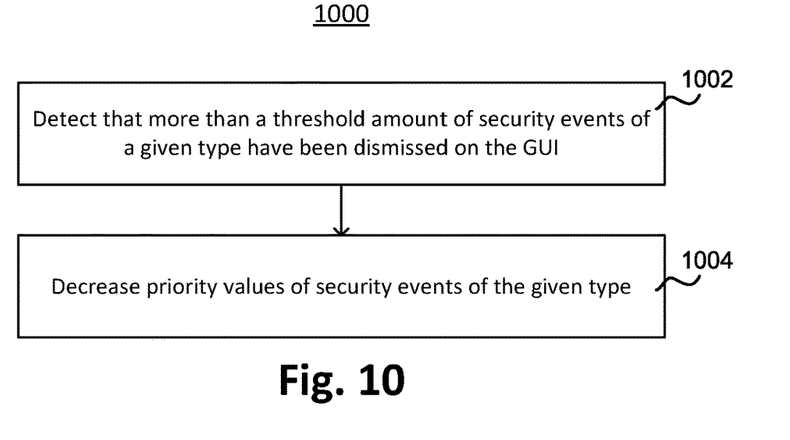
FIG. 10 is a flowchart illustrating a method of decreasing priority value based on GUI dismissals, in accordance with exemplary aspects of the present disclosure.

FIG. 10 is a flowchart illustrating a method 1000 of decreasing priority value based on GUI dismissals, in accordance with exemplary aspects of the present disclosure that may operate in association with method 600, 700, 800, and/or 900.

In an optional aspect, referring to FIG. 10, at block 1002, the method 1000 includes detecting that more than a threshold amount of security events of a given type have been dismissed on the GUI. For example, in an aspect, computing device 500, processor 505, memory 510, security visualization component 515, and/or detecting component 590 may be configured to or may comprise means for detecting that more than a threshold amount of security events of a given type have been dismissed on the GUI. In this case, a dismissal refers to deleting an identifier without performing any other actions.

Consider events of the type "authorized entry." During the morning, 100 employees may have entered an office building being monitored via the GUI. Initially the priority value may be "medium" for such events. However, the user of the GUI may dismiss all of the events. The threshold amount may be a predetermined value stored in memory 510 (e.g., 75). When the amount of dismissals exceeds the threshold amount, the understanding is that the event is not as important or relevant. To prevent the event from becoming distractions from more urgent events, the events should be made less prominent.

At block 1004, the method 1000 includes decreasing priority values of security events of the given type. For example, in an aspect, computing device 500, processor 505, memory 510, security visualization component 515, and/or decreasing component 595 may be configured to or may comprise means for decreasing priority values of security events of the given type.

Figure 11:
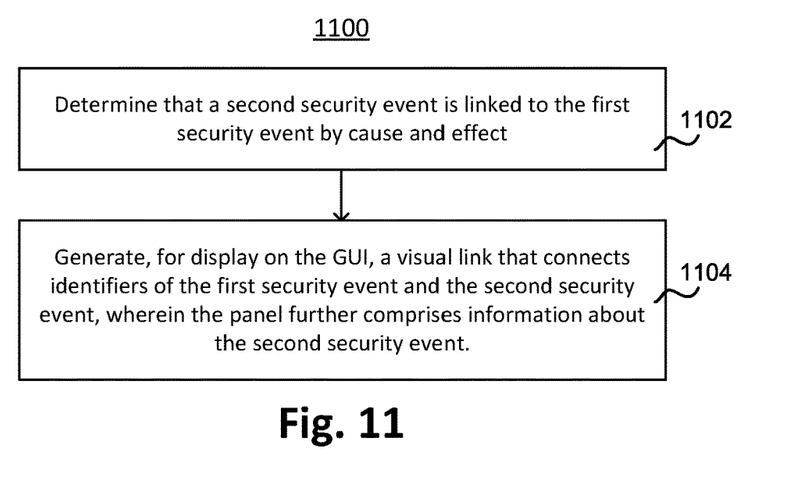
FIG. 11 is a flowchart illustrating a method of visually linking security event identifiers based on event relationships, in accordance with exemplary aspects of the present disclosure.

FIG. 11 is a flowchart illustrating a method 1100 of visually linking security event identifiers based on event relationships, in accordance with exemplary aspects of the present disclosure that may operate in association with method 600, 700, 800, 900, and/or 1000.

In an optional aspect, referring to FIG. 11, at block 1102, the method 1100 includes determining that a second security event is linked to the first security event by cause and effect. For example, in an aspect, computing device 500, processor 505, memory 510, security visualization component 515, and/or determining component 525 may be configured to or may comprise means for determining that a second security event is linked to the first security event by cause and effect.

In some aspects, determining component 525 may determine the linkage by detecting, based on identifier selections historically made on the GUI, that an indication of the second security event has been received after the first security event a threshold number of times in a given period of time. For example, the first security event may be a detection of smoke and the second security event may be detection of a fire. The period of time may be 1 minute.

In some aspects, determining component 525 may determine the linkage by detecting, based on identifier selections historically made on the GUI, that an identifier of the second security event has been selected after selection of the first identifier of the first security event a threshold number of times in a given period of time. For example, if a user selects smoke detection identifiers and then right after selects fire detection identifiers throughout the past year at least 20 times, determining component 525 may determine that fire detection identifiers are linked to smoke detection identifiers.

At block 1104, the method 1100 includes generating, for display on the GUI, a visual link that connects identifiers of the first security event and the second security event, wherein the panel further comprises information about the second security event. For example, in an aspect, computing device 500, processor 505, memory 510, security visualization component 515, and/or generating component 540 may be configured to or may comprise means for generating, for display on the GUI, a visual link (e.g., a line) that connects identifiers of the first security event and the second security event, wherein the panel (e.g., panel 402) further comprises information about the second security event.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for managing security events via a graphical user interface (GUI), comprising:
   a memory; and
   a processor coupled with the memory and configured to:
   receive an indication of a first security event occurring in an environment;
   generate, for display on the GUI, a first identifier of the first security event, wherein the first identifier is a selectable visual icon of a given shape; and
   generate, for display on the GUI, a visual link that connects the first identifier of the first security event and a second identifier of a second security event that is related to the first security event, in response to the second identifier of the second security event being selected after a selection of the first identifier of the first security event a threshold number of times in a given period of time based on identifier selections historically made on the GUI.

2. The apparatus of claim 1, wherein the processor is further configured to:
   receive the selection of the first identifier;
   generate, for display, a panel comprising information about the first security event and a plurality of actions to address the first security event, wherein the panel further comprises information about the second security event;
   receive a selection of an action from the plurality of actions; and
   execute the action to address the first security event.

3. The apparatus of claim 1, wherein the processor is further configured to:
   determine a priority value of the first security event based on a type of the first security event; and
   assign a size and color to the first identifier of the first security event based on the priority value.

4. The apparatus of claim 3, wherein to determine the priority value of the first security event based on the type of the first security event the processor is further configured to:
   retrieve the priority value from a database comprising a list of types of security events and corresponding priority values.

5. The apparatus of claim 3, wherein the processor is further configured to:
   identify a user of the GUI;
   retrieve a user profile of the user, wherein the user profile indicates the identifier selections historically made by the user on the GUI;
   determine a relevance of the type of the first security event to the user, wherein the relevance represents a likelihood of the user selecting the first identifier based on the identifier selections historically made by the user; and
   adjust the priority value of the first security event based on the likelihood.

6. The apparatus of claim 5, wherein the processor is further configured to:
   assign a new size and a new color to the first identifier based on the adjusted priority value; and
   generate, for display on the GUI, the first identifier with the new size and the new color.

7. The apparatus of claim 3, wherein the processor is further configured to:
   increase the priority value of the first security event in response to an indication that the first security event has not been resolved for more than a threshold period of time; and
   increase the size of the first identifier on the GUI based on the increase in the priority value.

8. The apparatus of claim 3, wherein the processor is further configured to:
   detect that more than a threshold amount of security events of a given type have been dismissed on the GUI; and
   decrease priority values of security events of the given type.

9. The apparatus of claim 1, wherein the processor is further configured to:
   generate the visual link in further response to an indication that the second security event has been received after the first security event a threshold number of times in the given period of time based on the identifier selections historically made on the GUI.

10. The apparatus of claim 1, wherein the GUI is configured to display the identifiers of one or more security events in a selectable layout of a plurality of selectable layouts, and wherein the selectable layout organizes the identifiers of the one or more security events based on at least one of: respective priority value, time of occurrence, or a location of occurrence.

11. A method for managing security events via a graphical user interface (GUI), comprising:
   receiving an indication of a first security event occurring in an environment;
   generating, for display on the GUI, a first identifier of the first security event, wherein the first identifier is a selectable visual icon of a given shape; and
   generating, for display on the GUI, a visual link that connects the first identifier of the first security event and a second identifier of a second security event that is related to the first security event, in response to the second identifier of the second security event being selected after a selection of the first identifier of the first security event a threshold number of times in a given period of time based on identifier selections historically made on the GUI.

12. The method of claim 11, further comprising:
receiving the selection of the first identifier;
generating, for display, a panel comprising information about the first security event and a plurality of actions to address the first security event, wherein the panel further comprises information about the second security event;
receiving a selection of an action from the plurality of actions; and
executing the action to address the first security event.

13. The method of claim 11, further comprising:
determining a priority value of the first security event based on a type of the first security event; and
assigning a size and color to the first identifier of the first security event based on the priority value.

14. The method of claim 13, wherein determining the priority value of the first security event based on the type of the first security event comprises:
retrieving the priority value from a database comprising a list of types of security events and corresponding priority values.

15. The method of claim 13, further comprising:
identifying a user of the GUI;
retrieving a user profile of the user, wherein the user profile indicates the identifier selections historically made by the user on the GUI;
determining a relevance of the type of the first security event to the user, wherein the relevance represents a likelihood of the user selecting the first identifier based on the identifier selections historically made by the user; and
adjusting the priority value of the first security event based on the likelihood.

16. The method of claim 15, further comprising:
assigning a new size and a new color to the first identifier based on the adjusted priority value; and
generating, for display on the GUI, the first identifier with the new size and the new color.

17. The method of claim 13, further comprising:
increasing the priority value of the first security event in response to an indication that the first security event has not been resolved for more than a threshold period of time; and
increasing the size of the first identifier on the GUI based on the increase in the priority value.

18. The method of claim 13, further comprising:
detecting that more than a threshold amount of security events of a given type have been dismissed on the GUI; and
decreasing priority values of security events of the given type.

19. The method of claim 11, further comprising:
generating the visual link in further response to an indication that the second security event has been received after the first security event a threshold number of times in the given period of time based on the identifier selections historically made on the GUI.

20. The method of claim 11, wherein the GUI is configured to display the identifiers of one or more security events in a selectable layout of a plurality of selectable layouts, and wherein the selectable layout organizes the identifiers of the one or more security events based on at least one of: respective priority value, time of occurrence, or a location of occurrence.

21. A non-transitory computer-readable medium storing instructions for managing security events via a graphical user interface (GUI), wherein the instructions are executable by a processor to:
receiving an indication of a first security event occurring in an environment;
generating, for display on the GUI, a first identifier of the first security event, wherein the first identifier is a selectable visual icon of a given shape; and
generating, for display on the GUI, a visual link that connects the first identifier of the first security event and a second identifier of a second security event that is related to the first security event, in response to the second identifier of the second security event being selected after a selection of the first identifier of the first security event a threshold number of times in a given period of time based on identifier selections historically made on the GUI.

* * * * *